US012134528B2

United States Patent
Buffat et al.

(10) Patent No.: US 12,134,528 B2
(45) Date of Patent: Nov. 5, 2024

(54) DEVICE FOR CONTROLLING PNEUMATIC COMPONENT

(71) Applicant: COVAL, Montelier (FR)

(72) Inventors: Emmanuel Buffat, Mauves (FR); Michel Cecchin, Montelier (FR); Pierre Milhau, Chatuzange-le-Goubet (FR)

(73) Assignee: COVAL, Montelier (FR)

( * ) Notice: Subject to any disclaimer, the term of this patent is extended or adjusted under 35 U.S.C. 154(b) by 834 days.

(21) Appl. No.: 17/285,342

(22) PCT Filed: Oct. 15, 2019

(86) PCT No.: PCT/EP2019/077981
§ 371 (c)(1),
(2) Date: Apr. 14, 2021

(87) PCT Pub. No.: WO2020/079004
PCT Pub. Date: Apr. 23, 2020

(65) Prior Publication Data
US 2021/0371214 A1    Dec. 2, 2021

(30) Foreign Application Priority Data
Oct. 19, 2018    (FR) ..................... 1859701

(51) Int. Cl.
*B65G 47/91*    (2006.01)
*B25J 15/06*    (2006.01)

(52) U.S. Cl.
CPC ......... *B65G 47/917* (2013.01); *B25J 15/0625* (2013.01)

(58) Field of Classification Search
CPC ................... B25J 15/0625; B25J 15/0633; B25J 15/0675; B66C 1/0256; B66C 1/0268; B65G 47/917
USPC ................................. 294/67.2, 186
See application file for complete search history.

(56) References Cited

U.S. PATENT DOCUMENTS

| 4,750,768 A | 6/1988 | Kumar | |
| 6,397,876 B1 * | 6/2002 | Golden | F04F 5/52 417/187 |
| 6,443,175 B1 * | 9/2002 | Pabst | F04F 5/52 137/12 |

(Continued)

FOREIGN PATENT DOCUMENTS

| DE | 202008016728 U1 * | 5/2010 |
| DE | 102016204122 A1 | 9/2017 |

(Continued)

*Primary Examiner* — Dean J Kramer
(74) *Attorney, Agent, or Firm* — MUNCY, GEISSLER, OLDS & LOWE, P.C.

(57) ABSTRACT

A control device for controlling a pneumatic component includes a compressed air supply circuit for connecting to an inlet of the pneumatic component. The circuit includes a normally closed monostable valve having an inlet for connecting to a compressed air source and an outlet for connecting to the pneumatic component, and a bistable directional valve having both a first port for connecting to the compressed air source and also a second port connected to a first port of a normally passing monostable directional valve, the monostable directional valve having a second port connected to a pneumatic control port of the monostable valve.

2 Claims, 3 Drawing Sheets

(56) References Cited

U.S. PATENT DOCUMENTS

| | | | | |
|---|---|---|---|---|
| 6,719,536 B2 * | 4/2004 | Schmalz | ................... | F04F 5/52 |
| | | | | 417/189 |
| 6,786,228 B2 * | 9/2004 | Pabst | ........................ | F04F 5/52 |
| | | | | 417/187 |

FOREIGN PATENT DOCUMENTS

| | | | |
|---|---|---|---|
| EP | 1719720 | A1 | 11/2006 |
| WO | WO-2005087631 | A1 | 9/2005 |

* cited by examiner

DEVICE FOR CONTROLLING PNEUMATIC COMPONENT

The present invention relates to the field of fluid flow control, in particular for handling by vacuum.

More particularly, the invention relates to a device for controlling a pneumatic component such as a Venturi vacuum pump or ejector. The invention also relates to a vacuum generator device comprising an ejector connected to such a control device.

BACKGROUND OF THE INVENTION

Ejectors are commonly used to supply the vacuum needed for suction handling operations, and more particularly for moving objects that are difficult to grip or fragile.

In outline, an ejector comprises a duct including a Venturi type nozzle having:
- an inlet orifice for connecting to a compressed air supply circuit;
- an outlet orifice for a jet of air accelerated by the nozzle; and
- a suction orifice arranged between the inlet orifice and the outlet orifice, through which suction is created by the jet of air flowing between the inlet orifice and the outlet orifice.

The suction orifice is connected to at least one suction cup arranged to be applied against the object to be gripped. The supply circuit is generally connected to the pressure source by a valve that may be controlled between a supply state enabling the supply circuit of the ejector to be put under pressure and thus enabling an object to be gripped, and an exhaust state enabling the supply circuit to be connected to the exhaust and thus let go the object. The supply to the ejector is maintained throughout the entire time the object is being gripped: the resulting consumption of compressed air is generally considered as being excessive.

Supply circuits are known that are provided with regulator means for automatically regulating the vacuum that is generated by the ejector, and thus make savings in compressed air. The principal consists in cutting off the supply to the ejector when the vacuum has reached a predetermined threshold, but without connecting the supply circuit to the exhaust in order to prevent the vacuum being lost. If, as a result of the leak, the vacuum drops below the predetermined threshold, then the supply to the ejector is re-established. As above, the object is let go by connecting the ejector to the exhaust.

The regulator means usually comprise an electronic control circuit for switching the valve between an open state for supplying compressed air to the ejector and a closed state for interrupting the supply to the ejector, but without connecting it to the exhaust. For reasons of cost and of simplicity of control, use is generally made of a monostable valve that is normally closed so that in the absence of electrical power at the control port of the valve, the valve is in its closed state. Nevertheless, in the event both of a failure of the electrical power supply and also of a leak downstream from the valve, the pressure in the suction cup will increase, thereby causing the object that is being lifted by suction to be dropped.

A known solution consists in using a capacitor or a battery that enables the valve to be returned to its open state during the power cut. Nevertheless, that solution requires an additional source of energy, thereby increasing the costs both of purchasing the supply circuit and also of using it.

OBJECT OF THE INVENTION

An object of the invention is thus to propose a device for controlling an ejector that makes it possible, even in the event of a voltage drop, to maintain a negative pressure and to obviate the above-mentioned drawbacks, at least in part.

SUMMARY OF THE INVENTION

In order to achieve this object, the invention proposes a control device for controlling a pneumatic component, the device comprising a compressed air supply circuit for connecting to an inlet of the pneumatic component. The circuit comprises both a normally closed monostable valve having an inlet for connecting to a compressed air source and an outlet for connecting to the pneumatic component, and also a bistable directional valve having both a first port for connecting to the compressed air source and also a second port connected to a first port of a normally passing monostable directional valve, the monostable directional valve having a second port connected to a pneumatic control port of the monostable valve.

The bistable directional valve is capable of adopting a passing state in which a connection is created between the first port and the second port of said directional valve, and a non-passing state in which the first port and the second port are disconnected from each other. The monostable directional valve is capable of adopting a rest state in which a connection is created between the first port and the second port of said directional valve, and an exhaust state in which the second port of said directional valve is connected to an exhaust outlet.

In particular manner, the control device includes an electronic control circuit for switching the directional valves.

Advantageously, the electronic control circuit then comprises both a first control unit arranged to control the state of the bistable directional valve, and also a second control unit arranged to put the monostable directional valve in the exhaust state.

The invention also provides a vacuum generator device comprising an ejector and such a control device, the outlet of the monostable valve being connected to an inlet orifice of the ejector.

BRIEF DESCRIPTION OF THE DRAWINGS

The invention can be better understood in the light of the following description, which description is purely illustrative and nonlimiting, and should be read with reference to the accompanying drawings, in which.

DETAILED DESCRIPTION OF THE INVENTION

With reference to the figures, the invention is described below in application to an ejector E for handling an object O.

In outline, the ejector E comprises a duct including a Venturi type nozzle having:
- an inlet orifice for connecting to a compressed air supply circuit;
- an outlet orifice connected to a silencer S; and a suction orifice arranged between the inlet orifice and the outlet orifice, through which suction is created by the jet of air flowing between the inlet orifice and the outlet orifice.

The suction orifice is connected to a calibrated check valve C, itself connected to a suction cup Ve. The suction cup Ve includes a bellows having a free end portion that is highly deformable in order to fit closely to the surface of an object O. A filter F2 is arranged between the suction cup Ve and the check valve C in order to avoid any malfunction of the ejector E. The ejector E is of conventional structure that is not described in greater detail herein.

The vacuum generator device of the invention, given overall reference 1, comprises a compressed air supply circuit 2 having an inlet connected to a compressed air source P and an outlet connected to an inlet orifice of the ejector E. A filter F1 is arranged between the compressed air source and the inlet of the supply circuit 2 in order to avoid polluting said supply circuit 2.

The supply circuit 2 comprises a normally closed monostable valve V having an inlet connected to the compressed air source P via the filter F1 and an outlet connected to the inlet orifice of the ejector E.

The supply circuit 2 also comprises a bistable directional valve D1 having both a first port connected to the compressed air source P via the filter F1, and also a second port connected to a first port of a normally passing monostable directional valve D2. A second port of the monostable directional valve D2 is connected to a control inlet or port of the monostable valve V.

Figure 1:
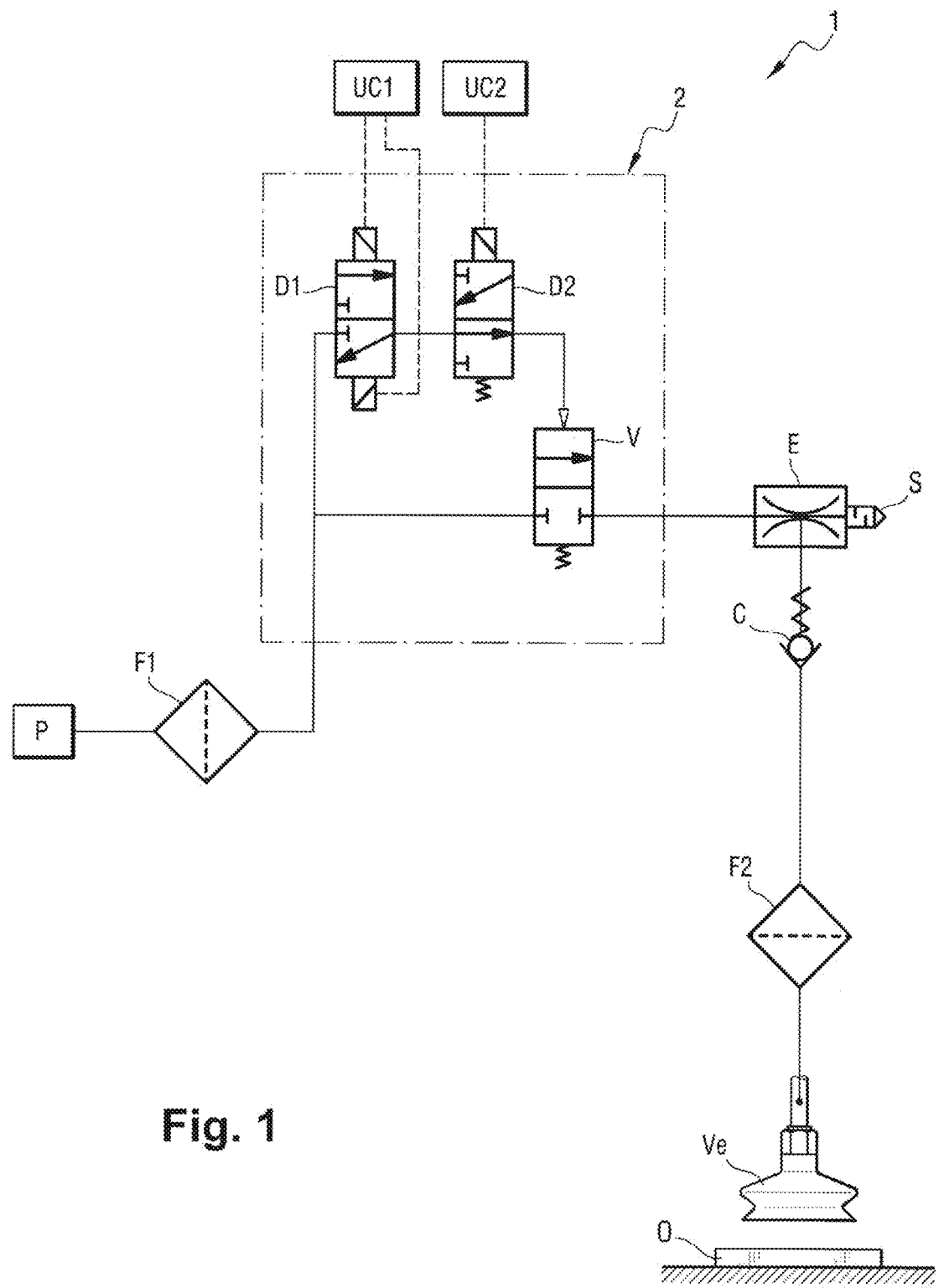
FIG. 1 is a diagrammatic view of a vacuum generator device in a particular embodiment of the invention, the device being off.
Figure 2:
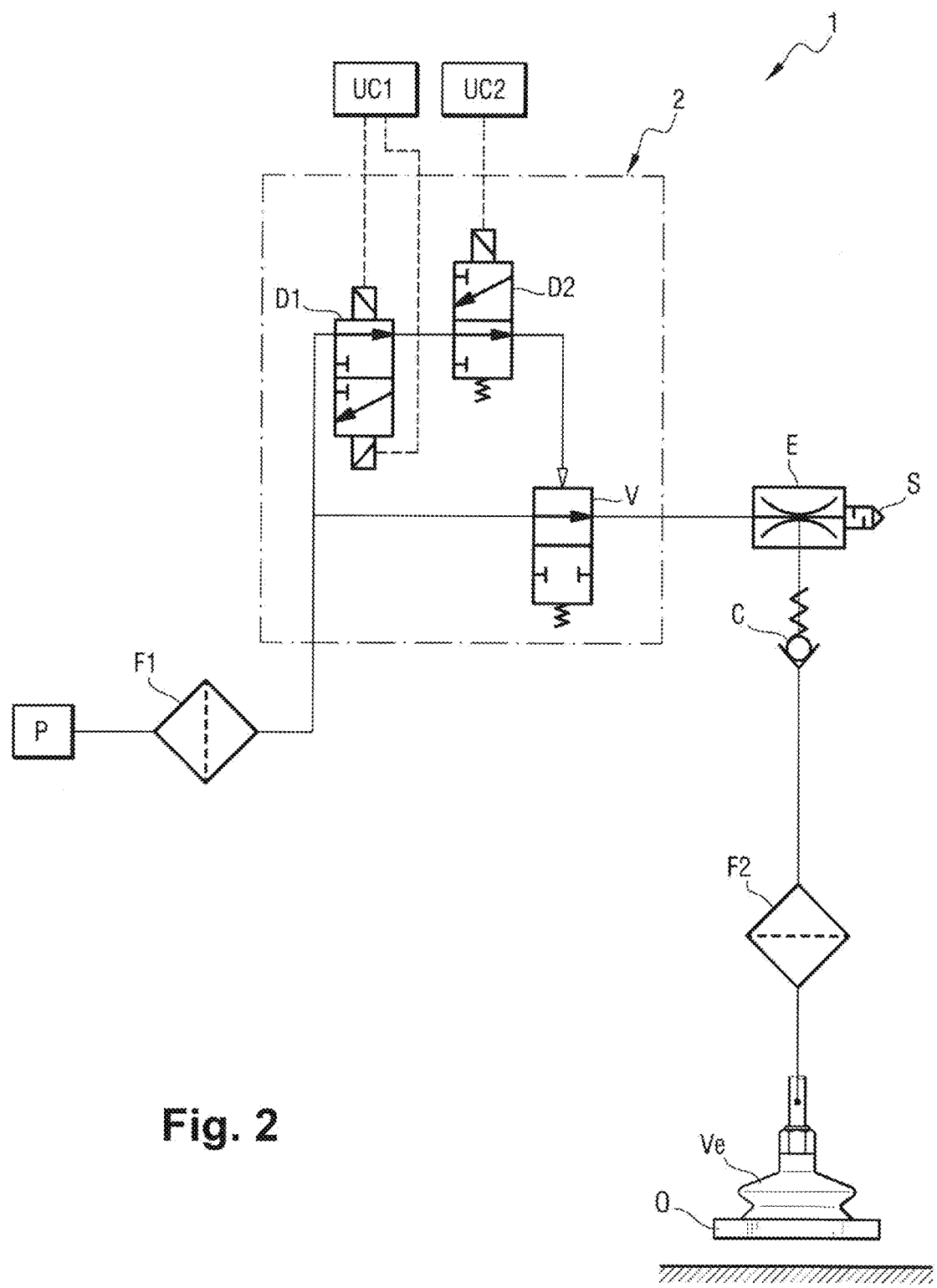
FIG. 2 is a view analogous to FIG. 1, the device being in an active suction stage.
Figure 3:
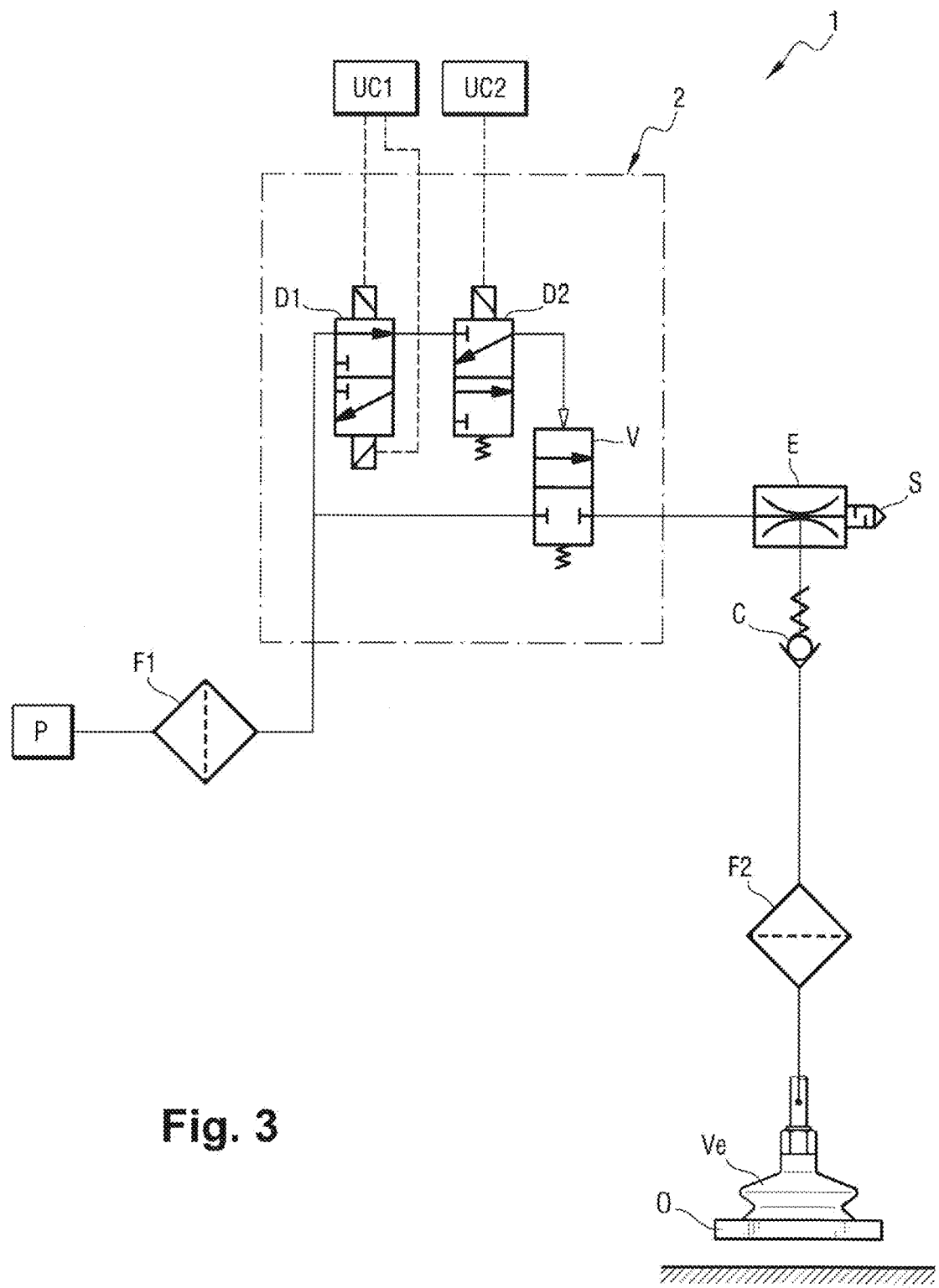
FIG. 3 is a view analogous to FIG. 1, the device being in a passive suction-maintaining stage.

In conventional manner, the bistable directional valve D1 has a slide that is capable of adopting two states: a passing state (shown in FIGS. 2 and 3) in which the slide provides a connection between the first port and the second port of said directional valve, and an exhaust state (shown in FIG. 1) in which the slide prevents air from passing between the first port and the second port, while connecting the second port to the open air.

The state of the bistable directional valve D1 is controlled by two electromagnets arranged at opposite ends of said valve in order to move the slide, such that an electrical pulse of at least 50 milliseconds (ms) generated by a first control unit UC1 serves to change the state of the bistable directional valve D1. It should be observed that in this example, a pulse of duration greater than 50 ms has no influence on the operation of the bistable directional valve D1.

In conventional manner, the monostable directional valve D2 has a slide that is capable of adopting two states: a rest state (shown in FIGS. 1 and 2) in which the slide establishes a connection between the first port and the second port of said directional valve, and an exhaust state (shown in FIG. 3) in which the slide inhibits the passage of air between the first port and the second port while connecting the second port to the open air.

The state of the monostable directional valve D2 is controlled by an electromagnet arranged at one end of said valve, such that a voltage generated by a second control unit UC2 moves the slide to enable the monostable directional valve D2 to pass from the rest state to the exhaust state.

The first and second control units UC1 and UC2 together with the supply circuit 2 form a device for controlling the ejector E. The control unit UC2 is connected to at least one pressure sensor (not shown) arranged in the proximity of the suction cup in order to monitor the pressure in the suction cup.

The operation of the device for controlling the ejector E is described below.

The first control unit UC1 serves to switch the ejector E to generating a vacuum by controlling the state of the bistable directional valve D1.

Thus, when a user of the vacuum generator device 1 seeks to lift an object O by using the suction cup Ve, the control unit D1 generates an electrical pulse having a duration of at least 50 ms in order to cause the bistable directional valve D1 to go from the exhaust state to the passing state. Compressed air then passes through the bistable directional valve D1 and the directional valve D2 in the rest state, thereby having the effect of causing the monostable valve V to pass from the closed state to the open state and thus supply compressed air to the ejector E. The object O is then sucked by the suction cup Ve and its free end portion becomes closely fitted to the surface of the sucked object O.

Thereafter, the second control unit UC2 serves to regulate the vacuum generated by the ejector E by controlling the state of the monostable directional valve D2.

Thus, when the vacuum measured by the pressure sensor arranged in the proximity of the vacuum cup Ve reaches a predetermined threshold, the control unit UC2 generates a voltage so as to cause the monostable directional valve D2 to pass from the rest state to the exhaust state, thereby having the effect of causing the monostable valve V to pass from the open state to the closed state. The ejector E is then no longer supplied with compressed air. The check valve C nevertheless prevents the vacuum being lost from the suction cup Ve, such that the object O remains pressed against the free end portion of the suction cup Ve. The control unit UC2 thus serves to make savings in compressed air.

If, as a result of a leak, the vacuum measured by the sensor drops below the predetermined threshold, the second control unit UC2 stops generating the voltage so as to cause the monostable directional valve D2 to pass from the exhaust state to the rest state, thereby having the effect of causing the monostable valve V to pass from the closed state to the open state, and thus of reactivating suction. The risk of letting the object O drop in the event of a leak is thus limited.

Likewise, when the voltage generated by the second control unit UC2 is insufficient or even non-existent, the monostable directional valve D2 passes from the exhaust state to the rest state, thereby, as above, having the effect of reactivating suction and thus of avoiding dropping the object O.

Thus, even in the event of a failure of a power supply of the second control unit UC2 or of a malfunction of the monostable directional valve D2, the control device 1 can nevertheless operate in a degraded mode, i.e. a mode without regulation of the vacuum, under the control of the first control unit UC1 and of the bistable directional valve D1 enabling the ejector E to be supplied permanently with compressed air.

Naturally, the invention is not limited to the embodiment described but covers any variant coming within the ambit of the invention as defined by the claims.

In the compressed air supply circuit, the positions of the bistable directional valve D1 and of the monostable directional valve D2 could be interchanged. The electronic control circuit may comprise two separate control units UC1 and UC2 as in the example described, however it could also comprise a single control unit.

The supply circuit may comprise components other than those described, and may be connected directly or indirectly to the pressure source.

The presence of the filter F1 between the compressed air source and the inlet of the supply circuit 2 is optional.

The presence of the filter F2 between the suction cup Ve and the check valve C is optional.

The monostable valve V may be a valve for amplifying the air flow rate.

The term "directional valve" is used to cover any fluid distribution device having two states (a passing supply state and a blocking or exhaust state) and control means for passing from at least one of the states to the other state. Directional valves that are controlled indirectly, in other words directional valves controlled by solenoid valves may replace the directly controlled directional valves D1 and D2.

The ejector E may be of any type (single stage, multistage, lubricated, without oil, . . . ).

The invention claimed is:

1. A control device —for controlling a pneumatic component, the device comprising a compressed air supply circuit —for connecting to an inlet of the pneumatic component, the circuit comprising both a normally closed monostable valve —having an inlet for connecting to a compressed air source —and an outlet for connecting to the inlet of the pneumatic component, and also a bistable directional valve —having both a first port for connecting to the compressed air source and also a second port connected to a first port of a normally passing monostable directional valve, the monostable directional valve —having a second port connected to a pneumatic control port of the monostable valve;
   the bistable directional valve being capable of adopting a passing state in which a connection is created between the first port and the second port of the bistable directional valve, and a non-passing state in which the first port and the second port are disconnected from each other; and
   the monostable directional valve being capable of adopting a rest state in which a connection is created between the first port and the second port of the monostable directional valve, and an exhaust state in which the second port of the monostable directional valve is connected to an exhaust outlet;
   the control device including an electronic control circuit for switching the bistable directional valve and the monostable directional valve, the electronic control circuit comprises both a first control unit arranged to control the state of the bistable directional valve, and also a second control unit arranged to put the monostable directional valve in the exhaust state.

2. A vacuum generator device comprising an ejector and a control device according to claim 1, the outlet of the monostable valve being connected to an inlet orifice of the ejector.

* * * * *